Oct. 24, 1944.    R. K. FRAZIER    2,361,349
VIBRATION INDICATOR
Filed April 9, 1942    2 Sheets-Sheet 1

INVENTOR
RADFORD K. FRAZIER
BY
Joseph Q. Stansfield
ATTORNEY

Oct. 24, 1944.    R. K. FRAZIER    2,361,349
VIBRATION INDICATOR
Filed April 9, 1942    2 Sheets-Sheet 2

INVENTOR
RADFORD K. FRAZIER
BY
Joseph Q. Stansfield
ATTORNEY

Patented Oct. 24, 1944

2,361,349

UNITED STATES PATENT OFFICE 2,361,349

VIBRATION INDICATOR

Radford K. Frazier, Baltimore, Md., assignor to Bendix Aviation Corporation, South Bend, Ind., a corporation of Delaware Application April 9, 1942, Serial No. 438,275

2 Claims. (Cl. 73—67)

This invention relates to vibration indicating apparatus and more particularly to a vibration indicator utilizing the persistence of vision in obtaining an indication of vibration amplitude.

A number of measuring devices in which a pointer and scale are situated in cooperative relationship for indicating vibration amplitude have been previously developed. The pointer and scale of the previously known systems have generally been mounted on independent mechanical systems having differing natural periods of oscillation. In the presence of vibration, the two systems respond in different degrees, giving rise to relative motion therebetween, and this relative motion has been utilized in a number of ways to provide indications of the amplitude of the impressed vibration. To provide an instrument completely housed within a single enclosure, it has been the practice to use one system as the mount for the other, with the necessity of providing bearings or resilient suspensions. The above instruments have proven satisfactory for intermittent use, as for the determination of the vibration amplitude existing in machine or engine installations during the initial installation or design of these machines or engines, but there are certain types of service for which they are not in the least suited, namely those installations where the vibration amplitude is to be constantly monitored. A vibration table used in the testing of aircraft equipment and instruments is an excellent example of such an installation, wherein a constant indication of the vibration amplitude is desired as a continuous check on the conditions of the test. When instruments of the above described type are used in this service, bearings are rapidly worn and suspensions become fatigued resulting in considerable loss in accuracy.

One of the principal objects of this invention is to provide a novel vibration indicator of simplified and economical construction.

Another object of this invention is to provide a new and novel vibration indicator suitable for continuous indication of vibration amplitudes.

Still another object of this invention is to provide new and novel vibration indicating apparatus having no bearings or suspensions to wear and deteriorate.

The above objects and advantages of the invention are accomplished by printing a triangularly shaped figure of contrasting appearance on a scale sheet, and providing adjacent said figure cooperating scale indicia. As the scale sheet with the imprinted figure is vibrated rapidly in the plane of the sheet, there is produced in the eye of the observer, due to persistence of vision, a modified figure having the shape of a triangle of lesser altitude than the original figure, and the altitude of the modified triangle observed is determined by the vibration amplitude, thus the cooperating scale, which is arranged parallel to the altitude, may be calibrated to indicate each of the vibration amplitudes corresponding to the various apparent altitudes.

Other objects and advantages will in part be disclosed and in part be obvious when the following specification is read in conjunction with the drawings in which.

In the drawings, like parts are designated by like reference characters.

Figure 1:
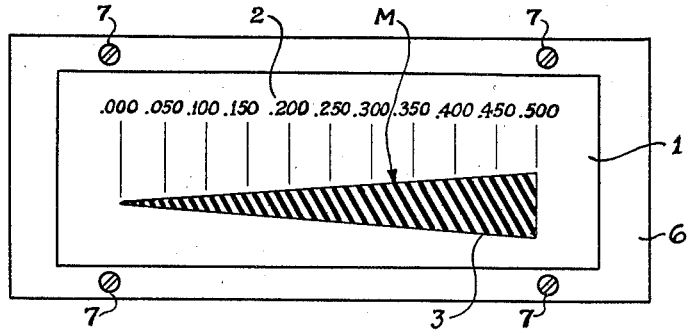
Figure 1 is a view in elevation of apparatus embodying the invention.
Figure 3:
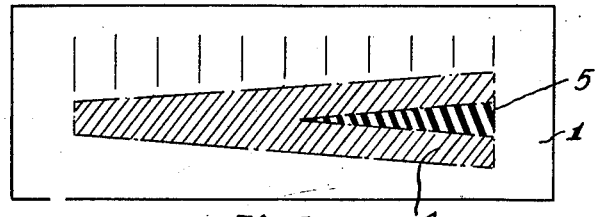
Figure 3 is a drawing illustrative of the appearance of the apparatus when in operation.

There is shown in Figure 1 a sheet of translucent material 1 having opaquely printed thereon the triangularly shaped figure 3 and the scale 2. The scale sheet 1 is mounted in a frame 6, which may be of any suitable material such as formed steel or aluminum, and secured by the screws 7.

Figure 2:
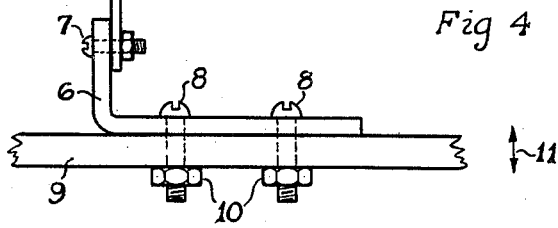
Figure 2 is a side view of the apparatus of Figure 1.

Referring to Figure 2, there is shown a side view of the apparatus of Figure 1 as mounted on the working surface of a vibration table 9. The assembly of the frame 6 and the scale sheet 1 with the screws 7 and their cooperating nuts are clearly visible. In this view, the frame 6 is shown secured to the vibration table 9 by the screws 8 and nuts 10. While in operation, the vibration table 9 moves in the manner indicated by the double ended arrow 11, that is, parallel to the plane of the scale sheet 1.

Turning to Figure 3, there is shown the appearance of the scale sheet 1 in the presence of vibration. The numeral 5 indicates a triangularly shaped umbra, or region from which light is totally excluded, while the numeral 4 indicates a penumbra, or region from which light is only partially excluded, i. e. light is apparent at each of the points in the penumbra 4 at some time during the cycle of vibration movement.

Figure 4:
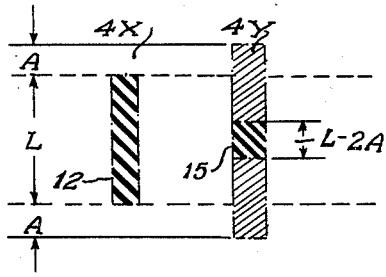
Figure 4 is a diagram illustrating the mode of operation of the invention.

In utilizing my invention, the scale sheet 1 is illuminated from the rear; if the apparatus is located near a window this light may be sufficient, but if desired, any artificial source may be employed. The actual mode of operation may be more clearly understood by reference to Figure 4 which shows an element of the triangular figure 3 of Figure 1 taken at the point M and greatly magnified laterally. The element 12 to be discussed is shown stationary at 4x and in vibratory motion along its major axis at 4y. With the element 12 stationary as at 4x, light is excluded from its entire length L. Assuming that the element is now vibrated vertically through the half-amplitude A, or total excursion 2A, it is seen at 4y that the only region which remains covered by some portion of the element 12 at all times is the central area 15, having the length L—2A. The triangularly shaped umbra 5 of Figure 3 is the result of the adjacently disposed dark central areas of the myriads of elements of infinitesimal width and varying length comprising the triangular figure 3 of Figure 1. At the point along this triangle 3 where the length of the element is equal to the total excursion, L—2A vanishes, defining the apex point of the triangular umbra 5. Thus, by calibrating the scale 2 to indicate the width of the triangle 3 measured parallel to its base, or normal to its major axis, at the point opposite the given index mark or calibration point, it is possible to read directly from this scale the total vibration amplitude, the scale being read opposite the vertex of the triangularly shaped umbra 5.

Figure 5:
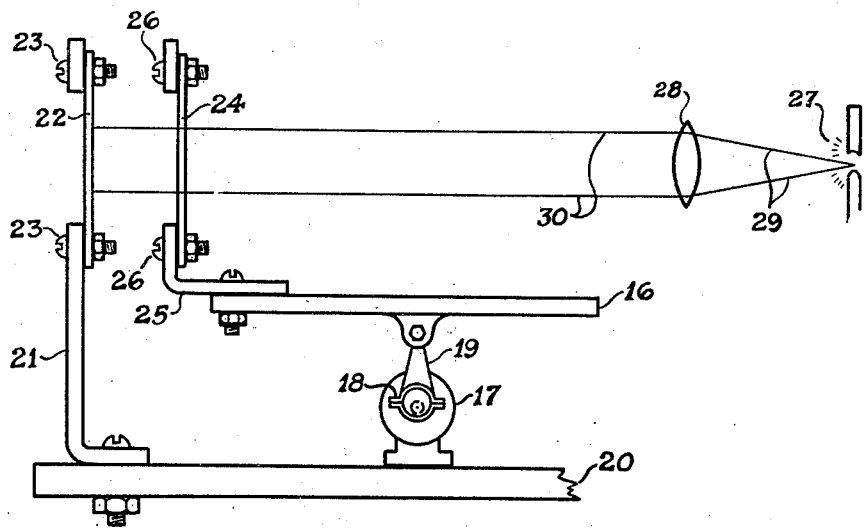
Figure 5 is a side view showing an alternative form in which the invention may be practiced.

The arrangement of Figure 5 shows the vibration table 16 driven by the motor 17 through the eccentric 18 and the connecting rod 19, the entire assembly being mounted on the base 20. Also secured to the base 20 is the bracket 21 carrying the translucent scale plate 22 which is held in place by the screws 23 and their cooperating nuts. The object plate 24 which may be transparent, is mounted on the bracket 25 by the screws 26, and the bracket 25, in turn, is secured to the vibration table 16. A light source 27 is employed, and the divergent rays 29 emanating from this source 27 are rendered substantially parallel at 30 by converging lens 28.

Figure 6:
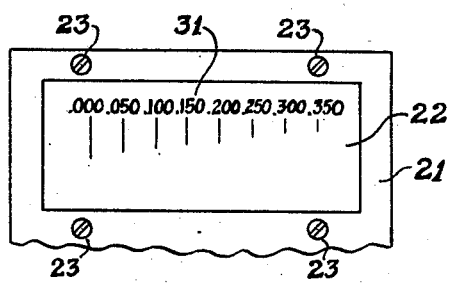
Figure 6 is a front view of the scale plate of Figure 5.

Referring to Figure 6, there is shown in front elevation the scale plate 22 mounted in the bracket 21 by the screws 23. This view also shows the scale 31 which may be printed on the scale plate 22.

Figure 7:
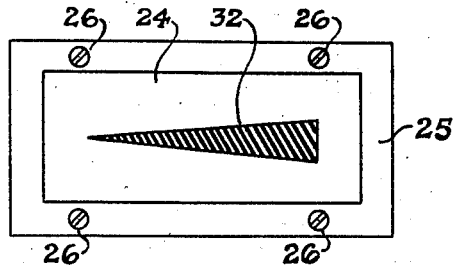
Figure 7 is a front view of the object plate of Figure 5.

In Figure 7 is seen the object plate 24 mounted in bracket 25 by the screws 26, this object plate 24 carrying the opaque triangle 32.

The optical system of Figure 5 projects the silhouette of the triangle 32 on to the translucent scale plate 22 adjacent the scale 31, producing a composite image on the scale plate 22 similar to that of Figure 1. Operation of the vibration table 16 gives rise to oscillatory displacement of the object plate 24, causing the projected triangular silhouette of the triangle 32 to move accordingly, producing a composite image on scale plate 22 which is similar to that shown in Figure 3. The theory of operation is similar to that previously outlined, and the vibration amplitude is determined in the same way, namely, by reading the scale 31 opposite the vertex of the triangularly shaped umbra which is produced.

The arrangement of Figure 1 is most advantageously employed for the measurement of small amplitudes of vibration. When large amplitudes of vibration are under measurement, the numerals of scale 2 tend to become indistinct, and under these conditions, it may be preferable to employ the arrangement of Figure 5.

While I have described the operation of my invention using a translucent scale sheet and a triangularly shaped opaque figure printed thereon, it is obvious that an opaque scale sheet may be employed with a figured surface having any desired distinguishing characteristic, such as color or reflection characteristic, illumination from the front being advantageously employed in this instance. By using complementary colors for the scale sheet and the figure, the indicating triangle may be made to appear as a color against a gray or white background. Although I have employed a triangular figure for the purposes of explanation, the length of the figure elements may be related in a manner other than linear to the distance measured along the cooperating scale, as for example, logarithmically or exponentially. If it is desired to limit the possible range of measurement, a trapezium may be substituted for the triangular figures utilized for the purpose of explanation. As a further simplification, the figure may consist merely of a pair of angularly disposed lines. In addition, printing is but one of a number of satisfactory methods for defining a suitable figure on the scale sheet; etching, painting, and silk-screening being examples of other satisfactory methods.

The figures associated with the graduated scale may be indicative of some condition controlled by the vibration amplitude, as for example, the maximum acceleration experienced by a body on the vibration table at a specific frequency of vibration with the various vibration amplitudes within the range of indication, rather than indicating the total excursion or half-amplitude of vibration.

It will be obvious that many changes and modifications may be made in the invention without departing from the spirit thereof as expressed in the foregoing description and in the appended claims.

What I claim is:

1. In vibration indicating apparatus utilizing persistence of vision, a base, a vibration table mounted on said base, a translucent scale member having scale indicia thereon, means for mounting said scale member on said base, a substantially transparent object plate, an opaque figure of predetermined shape carried by said object plate, means for mounting said object plate on said vibration table, and means for projecting a silhouette of said figure on said scale member adjacent said scale indicia.

2. In vibration indicating apparatus utilizing persistence of vision, a base, a vibration table mounted on said base, a translucent scale member having scale indicia thereon, means for mounting said scale member on said base, a substantially transparent object plate, an opaque triangular figure carried by said object plate, means for mounting said object plate on said vibration table, and means for projecting a silhouette of said figure on said scale member adjacent said scale indicia.

RADFORD K. FRAZIER.